United States Patent Office  3,130,177
Patented Apr. 21, 1964

3,130,177
BLENDS OF POLYCARBONATES WITH POLY-
BUTADIENE, STYRENE, ACRYLONITRILE
GRAFT COPOLYMERS
Thomas S. Grabowski, Vienna, W. Va., assignor to Borg-
Warner Corporation, Chicago, Ill., a corporation of
Illinois
No Drawing. Filed Mar. 24, 1961, Ser. No. 98,012
5 Claims. (Cl. 260—45.5)

The present invention relates to synthetic resins having new and unique properties. More particularly, this invention relates to synthetic resins exhibiting unexpected thermoplastic properties.

The polycarbonate resins have excellent properties for molded and shaped articles. However, due to the low thermoplasticity of the polycarbonates, it is very difficult to utilize the polycarbonates to the fullest extent due to their low flow characteristics.

The present invention relates to the improvement of the thermoplasticity of the polycarbonates and in particular contemplates the blending of polycarbonates and more particularly the polycarbonate of 2,2-(4,4'-dihydroxy-diphenyl)-propane with certain graft copolymers containing butadiene, acrylonitrile and styrene and more particularly to a graft copolymer prepared by polymerizing styrene and acrylonitrile monomers in the presence of polybutadiene.

THE POLYCARBONATE

The polycarbonates of the present invention are made by converting di-(mono-hydroxy phenyl)-substituted aliphatic hydrocarbons with phosgene in a manner well known in the art. For example, British Patent 772,627, April 17, 1957, discloses suitable examples of the di-(mono-hydroxy phenyl)-substituted aliphatic hydrocarbons and the methods of converting these materials to polycarbonates. A typical polycarbonate for utilization in the present invention is the polycarbonate of 2,2-(4,4'-dihydroxy-diphenyl)-propane, which polycarbonate has the following properties:

| | |
|---|---|
| Izod impact strength, ft. lb./inch notch ⅛" bar | 14.8 |
| Tensile strength, p.s.i., 73° F. | 8800 |
| Tensile elongation, percent | 60 |
| Hardness, Rockwell | 125 |
| Melt index, 410° F.[1] | .3A1 |
| Deflection temperature, ° F., ½" x ½" x 5" bar, 66 p.s.i | 291 |
| Deflection temperature, ° F., ½" x ½" x 5" bar, 264 p.s.i. | 273 |

[1] Modification of the procedure set forth in A.S.T.M. Method D-1238-52T. This procedure was originally developed for determining the melt index of polyethylene. Broadly and briefly, in this method, the weight in grams of polyethylene that is discharged during a period of three minutes through a standard orifice positioned below a reservoir of the polymer that is at a standard temperature and under a standard pressure is determined. This determination is proportioned to give the grams of polymer discharged during ten minutes which figure is, by definition, the melt index of polyethylene.

Since the thermoplasticity of the blends with which this invention is concerned is not even of the same order of magnitude as that of polyethylene, a considerable modification of the standard conditions and dimensions set forth in A.S.T.M. Method D-1238 had to be made in order to make this general method applicable to the blends with which this invention is concerned. These modifications involved changes in the size of the orifice, the pressure applied to the plastic in the reservoir, the reservoir temperature, and the like.

As used herein, melt indexes express the weight in grams of polymer blend discharged in one minute through an orifice 0.125 inch in diameter and 0.315 inch long from a reservoir 0.373 inch in diameter containing polymer maintained at a temperature of 410° F. and under a pressure produced by a 5664 g. load. Thus, a melt index of .3A1 means that .3 g. of polymer were discharged through the orifice in one minute under the conditions named. Similarly, a melt index of .1A3 means that 1 g. of polymer was discharged through the orifice in three minutes under the named conditions.

GRAFT COPOLYMER

Within recent years it has become increasingly common practice to prepare polymeric products by the so-called "graft" copolymerization technique. As may be determined by reference to the Report on Nomenclature of the International Union of Pure and Applied Chemistry (published in the Journal of Polymer Science, volume 8, page 260, 1952), the term "graft copolymerization" is employed to designate the process wherein a polymerizable monomer (or mixture of polymerizable monomers) is reacted, under polymerizing conditions, in the presence of a previously formed polymer or copolymer. "A graft copolymer is a high polymer, the molecules of which consist of two or more polymeric parts, of different composition, chemically united together. A graft copolymer may be produced, for example, by polymerization of a given kind of monomer with subsequent polymerization of another kind of monomer onto the product of the first polymerization."

Graft polymers suitable for use in the production of the blends of this invention may be prepared by the interaction, under polymerizing conditions, of a mixture of an alkenyl cyanide and a vinyl aromatic hydrocarbon exemplified, respectively, by acrylonitrile and styrene, with a polybutadiene latex. The organic portion of the reaction mixture comprises about 40%–90% by weight combined acrylonitrile plus styrene and about 60% to 10% by weight (dry basis) polybutadiene. The acrylonitrile preferably comprises from 5%–30% by weight of the three component organic mixture (acrylonitrile plus styrene plus polybutadiene), the styrene 30%–80% by weight and the polybutadiene, correspondingly, 10%–60% by weight of the three component organic mixture.

For the better understanding of this invention, the following example sets for a description of the preparation of two representative graft polymers suitable for use in forming the new and improved blends of this invention.

EXAMPLE 1

| | X | Y |
|---|---|---|
| Polybutadiene latex, polybutadiene equivalent | 30.0 | 45.0 |
| Acrylonitrile | 25.0 | 15.0 |
| Styrene | 45.0 | 40.0 |
| Cumene hydroperoxide | 0.75 | 1.0 |
| Sodium salt of hydrogenated disproportionated rosin | 2.0 | 1.85 |
| Sodium pyrophosphate | 0.5 | 0.5 |
| Sodium hydroxide | 0.15 | 0.105 |
| Sodium salt of condensed alkyl naphthalene sulfonic acid | 0.15 | |
| Dextrose | 1.0 | 1.0 |
| Ferrous sulfate | 0.01 | 0.011 |
| Water, including water present in the polybutadiene latex | 160.0 | 182.0 |

Recipe X was introduced into a glass reactor which was sealed and tumbled for six hours in a water bath heated to 65–85° C. At the end of this time, reaction was essentially complete. The copolymer formed was recovered as follows: The final reaction mixture was coagulated with dilute brine and sulfuric acid, heated to 95° C. to produce partial granulation of the coagulated product to facilitate subsequent filtration and washing operations, filtered, washed and finally dried to constant weight at 110° C.

Recipe Y was charged into a pressure tight reactor. The reactor was placed in a water bath and heated to a temperature of 60° C. and maintained at this temperature under autogeneous pressure for a period of 85 minutes. At this time, the reaction was essentially complete.

The graft copolymer Y was recovered as follows: The final latex was coagulated with dilute brine and sulfuric acid, heated to 95° C. to produce partial granulation of the coagulated product to facilitate subsequent filtration and washing operations, filtered, washed and finally dried to constant weight at 110° C.

Certain physical properties of the graft copolymers prepared as above described are tabulated below:

| Graft copolymer | X | Y |
|---|---|---|
| Izod Impact Strength, ft. lb./inch notch 1/8" | 8.5 | 3.0 |
| Melt Index, 410° F.[1] | .1A3 | [2] WNE |
| Tensile Strength, p.s.i., 73° F | 5,100 | 2,900 |
| Tensile Elongation, percent | 25 | 50 |
| Deflection Temperature, ° F., 1/2" x 1/2" x 5" bar, 66 p.s.i. | 212 | 183 |
| Deflection Temperature, ° F., 1/2" x 1/2" x 5" bar, 264 p.s.i. | 192 | 160 |
| Hardness Rockwell R | 87 | |
| Hardness—Shore D | | 64 |

[1] Modified as heretofore defined.
[2] Will not extrude under the heretofore defined melt index.

EXAMPLE 2

Graft copolymer X was blended with 2,2-(4,4'-dihydroxy-diphenyl)-propane at various graft copolymer-polycarbonate ratios. In making the blends, the graft copolymer and the polycarbonate were mixed with one part by weight of calcium stearate and the mixture was worked in a Banbury mixer at a temperature of about 420° F. Milling was then continued on a two-roll mill until a uniform blend was obtained, and the blend was then sheeted. In all instances, milling operating provided rapid and complete blending of the mill recipe forming the sheet.

*Table I*

| Sample | A | B | C | D | E | F | G | H |
|---|---|---|---|---|---|---|---|---|
| Polycarbonate of 2,2-(4,4'-dihydroxy-diphenyl)-propane | 90 | 80 | 70 | 60 | 50 | 30 | 20 | 10 |
| Graft copolymer X | 10 | 20 | 30 | 40 | 50 | 70 | 80 | 90 |
| Ca. Stearate | 1.0 | 1.0 | 1.0 | 1.0 | 1.0 | 1.0 | 1.0 | 1.0 |
| Izod Impact Strength, ft. lb./inch notch 1/8" | 11.1 | 13.1 | 9.4 | 9.1 | 7.3 | 7.7 | 8.4 | 8.9 |
| Melt Index, 410° F.[1] | .8A1 | .9A1 | .7A1 | .6A1 | .5A1 | .6A1 | .2A1 | .3A3 |
| Tensile Strength, p.s.i., 73° F | 8,600 | 8,600 | 7,700 | 7,400 | 6,900 | 6,100 | 5,600 | 5,300 |
| Tensile Elongation | 35 | 20 | 20 | 35 | 10 | 10 | 15 | 25 |
| Deflection Temperature, ° F., 1/2" x 1/2" x 5" bar, 66 p.s.i. | 278 | 275 | 264 | 257 | 253 | 220 | 216 | 213 |
| Deflection Temperature, ° F., 1/2" x 1/2" x 5" bar, 264 p.s.i. | 263 | 266 | 241 | 229 | 219 | 203 | 204 | 190 |
| Hardness Rockwell R | 123 | 122 | 112 | 113 | 108 | 99 | 96 | 95 |

[1] Modified as heretofore defined.

EXAMPLE 3

Graft copolymer Y prepared as set out hereinabove was blended with 2,2-(4,4'-dihydroxy-diphenyl)-propane at various graft copolymer-polycarbonate ratios. In making the blends, the same procedure of Example 2 was followed.

*Table II*

| Sample | A | B | C |
|---|---|---|---|
| Polycarbonate of 2,2-(4,4'-dihydroxy-diphenyl)-propane | 80 | 60 | 40 |
| Graft copolymer Y | 20 | 40 | 60 |
| Ca. Stearate | 1.0 | 1.0 | 1.0 |
| Izod Impact Strength, ft. lb./inch notch 1/8" bar | 8.3 | 5.5 | 3.9 |
| Tensile Strength, p.s.i., 73° F | 7,300 | 6,100 | 5,000 |
| Tensil Elongation, percent | 20 | 54 | 20 |
| Hardness Rockwell | R-116 | R-103 | R-88 |
| Melt Index, 410° F.[1] | 1.3A1 | 0.6A1 | 1.2A3 |
| Flexural Modulus, p.s.i., 1/4" x 1/2" x 6" 73° F | $2.9 \times 10^5$ | $2.8 \times 10^5$ | $2.0 \times 10^5$ |
| Flexural Strength, 73° F | 11,330 | 10,140 | 6,470 |
| Deflection Temperature, °F., 1/2" x 1/2" x 5" bar, 12 p.s.i. | 284 | 297 | 281 |
| Deflection Temperature, °F., 1/2" x 1/2" x 5" bar, 264 p.s.i. | 258 | 212 | 187 |

[1] Modified A.S.T.M. D1238–52T as defined heretofore.

Blends prepared in accordance with this invention may contain additional components, such as for example, pigments fillers and the like, which are frequently incorporated into resins and resin blends in accordance with conventional practices well known to those skilled in the art.

As evidenced by comparison of the physical properties of the polycarbonate and the graft copolymer with the blends of these two materials, the thermoplasticity, as exemplified by the melt index of samples A–F inclusive is strikingly better for molding purposes than either of the blending components.

In the preparation of the graft copolymer blending component of this invention, the styrene may be replaced, in part or entirely, by other vinyl aromatic hydrocarbons, such as alpha methyl styrene, vinyl toluenes, alpha methyl vinyl toluenes and the like, including mixtures of two or more such hydrocarbons. Also, the acrylonitrile may be replaced, in part or entirely, with other alkenyl cyanides such as methacrylonitrile and ethacrylonitrile.

While the polycarbonate of 2,2-(4,4'-dihydroxydiphenyl)-propane has been used in the specific examples, other polycarbonates of di-(monohydroxyphenyl)-substituted aliphatic hydrocarbons in which both hydroxyphenyl groups are attached to the same carbon atom of the hydrocarbon can be substituted therefor. Suitable polycarbonates of di-(monohydroxyphenyl)-substituted aliphatic hydrocarbons are, for example, the polycarbonates of (4,4'-dihydroxydiphenyl)-methane, 1,1-(4,4'-dihydroxydiphenyl)-cyclohexane, 2,2-(4,4'-dihydroxy-diphenyl)-butane, 2,2-(4,4'-dihydroxy-diphenyl)-pentane, 2,2-(4,4'-dihydroxy-diphenyl)-hexane, and 2,2-(4,4'-dihydroxydiphenyl)-heptane.

The blends of the present invention find their field of greatest usefulness in the fabrication of shaped articles that are most economically produced by injection molding techniques, particularly rigid shaped articles that are subjected to stresses during assembly and that may be subsequently subjected to vibration, shock, impact loads, and the like during use. Also, the blends of this invention may be processed by calendering, vacuum forming, extrusion, and similar known production techniques.

While this invention has been described in connection with certain specific details and examples thereof, these details and examples are illustrative only and are not to be considered limitations on the spirit or scope of said invention except insofar as these may be incorporated in the appended claims.

I claim:

1. A composition comprising a blend of (a) the polycarbonate of a di-(mono-hydroxyphenyl)-substituted aliphatic hydrocarbon and (b) a graft copolymer of (1) polybutadiene and (2) a mixture of alkenyl cyanide and a vinyl aromatic hydrocarbon.

2. A composition comprising a blend of (a) the polycarbonate of 2,2-(4,4'-dihydroxy-diphenyl)-propane and (b) a graft copolymer of (1) polybutadiene and (2) a mixture of alkenyl cyanide and a vinyl aromatic hydrocarbon.

3. A composition comprising a blend of (a) the polycarbonate of 2,2-(4,4'-dihydroxy-diphenyl)-propane and (b) a graft copolymer of (1) polybutadiene and (2) a mixture of acrylonitrile and styrene.

4. A composition comprising a blend of (a) from about 90 to 30 parts by weight of a polycarbonate of 2,2-(4,4'-dihydroxy-diphenyl)-propane and (b) correspondingly, from about 10 to 70 parts by weight of a graft copolymer of (1) polybutadiene and (2) a mixture of alkenyl cyanide and a vinyl aromatic hydrocarbon.

5. A composition comprising a blend of (a) from about 90 to 30 parts by weight of a polycarbonate of 2,2-(4,4'-dihydroxy-diphenyl)-propane and (b) correspondingly, from about 10 to 70 parts by weight of a graft copolymer of (1) polybutadiene and (2) a mixture of acrylonitrile and styrene.

References Cited in the file of this patent

UNITED STATES PATENTS

| | | |
|---|---|---|
| 2,789,971 | Reynolds et al. | Apr. 23, 1957 |
| 2,820,773 | Childers | Jan. 21, 1958 |

FOREIGN PATENTS

| | | |
|---|---|---|
| 772,627 | Great Britain | Apr. 17, 1957 |

UNITED STATES PATENT OFFICE
CERTIFICATE OF CORRECTION

Patent No. 3,130,177                  April 21, 1964

Thomas S. Grabowski

It is hereby certified that error appears in the above numbered patent requiring correction and that the said Letters Patent should read as corrected below.

Column 2, line 5, for "1 g." read -- .1 g. --; column 3, Table II, under the heading "B", line 6 thereof, for "54" read -- 45 --.

Signed and sealed this 18th day of August 1964.

(SEAL)
Attest:

ERNEST W. SWIDER
Attesting Officer

EDWARD J. BRENNER
Commissioner of Patents